United States Patent [19]

Heitmann

[11] Patent Number: 4,491,869
[45] Date of Patent: Jan. 1, 1985

[54] PULSE CODE MODULATION SYSTEM SUITABLE FOR DIGITAL RECORDING OF BROADBAND ANALOG SIGNALS

[75] Inventor: Jürgen Heitmann, Alsbach-Hähnlein, Fed. Rep. of Germany

[73] Assignee: Robert Bosch GmbH, Stuttgart, Fed. Rep. of Germany

[21] Appl. No.: 361,528

[22] Filed: Mar. 23, 1982

[30] Foreign Application Priority Data

Apr. 3, 1981 [DE] Fed. Rep. of Germany ....... 3113397

[51] Int. Cl.³ .................. H04N 5/40; H04N 9/493
[52] U.S. Cl. ..................... 358/141; 340/347 DD; 358/12; 358/13; 375/25
[58] Field of Search ............ 358/141, 13, 12, 310, 358/315; 178/113; 375/25; 371/37, 52; 340/347 DD

[56] References Cited

U.S. PATENT DOCUMENTS

| | | | |
|---|---|---|---|
| 4,204,163 | 5/1980 | Jager | 375/25 |
| 4,286,291 | 8/1981 | Taylor | 358/13 |
| 4,347,619 | 8/1982 | Dakin | 358/141 |
| 4,387,406 | 6/1983 | Ott | 375/25 |
| 4,396,906 | 8/1983 | Weaver | 340/347 DD |

Primary Examiner—Michael A. Masinick
Attorney, Agent, or Firm—Frishauf, Holtz, Goodman & Woodward

[57] ABSTRACT

The d.c. component of video signals is to a great extent eliminated for a wide range of content, sufficiently for recording, for example, without the introduction of redundancy in the digital coding, when the digital words corresponding to samples of the analog signal are converted into a binary code in which the number of bits of one logic level is approximately linearly dependent upon the magnitude of the analog signal. In such a code, there are successive ranges of the analog signal in which the number of bits of one logic level remains the same, and within said ranges the change in digital words from one analog level to the next involves the change of two bits of the word. The digital words are serially provided for recording or transmission.

18 Claims, 8 Drawing Figures

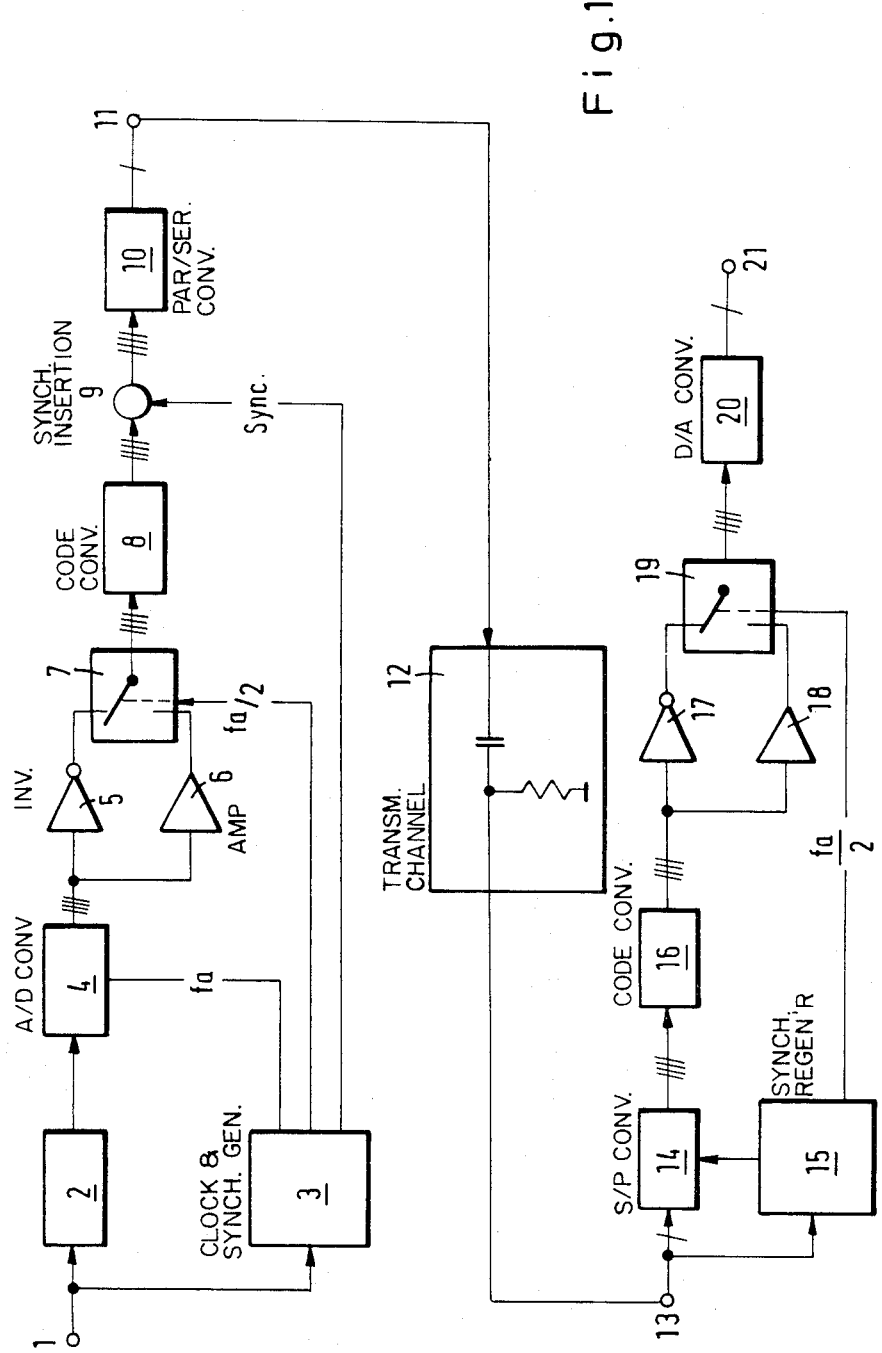

| Dezimal | Hexa-Dezimal | 8-Bit Code |
|---|---|---|
| | ⟷ | |
| 0  | 00 \|\| 00 | 0 0 0 0   0 0 0 0 |
| 1  | 01 \|\| 01 | 0 0 0 0   0 0 0 1 |
| 2  | 02 \|\| 02 | 0 0 0 0   0 0 1 0 |
| 3  | 03 \|\| 04 | 0 0 0 0   0 1 0 0 |
| 4  | 04 \|\| 08 | 0 0 0 0   1 0 0 0 |
| 5  | 05 \|\| 10 | 0 0 0 1   0 0 0 0 |
| 6  | 06 \|\| 20 | 0 0 1 0   0 0 0 0 |
| 7  | 07 \|\| 40 | 0 1 0 0   0 0 0 0 |
| 8  | 08 \|\| 80 | 1 0 0 0   0 0 0 0 |
| 9  | 09 \|\| 81 | 1 0 0 0   0 0 0 1 |
| 10 | 0A \|\| 82 | 1 0 0 0   0 0 1 0 |
| 11 | 0B \|\| 84 | 1 0 0 0   0 1 0 0 |
| 12 | 0C \|\| 88 | 1 0 0 0   1 0 0 0 |
| 13 | 0D \|\| 48 | 0 1 0 0   1 0 0 0 |
| 14 | 0E \|\| 44 | 0 1 0 0   0 1 0 0 |
| 15 | 0F \|\| 42 | 0 1 0 0   0 0 1 0 |
| 16 | 10 \|\| 41 | 0 1 0 0   0 0 0 1 |
| 17 | 11 \|\| 21 | 0 0 1 0   0 0 0 1 |
| 18 | 12 \|\| 22 | 0 0 1 0   0 0 1 0 |
| 19 | 13 \|\| 24 | 0 0 1 0   0 1 0 0 |
| 20 | 14 \|\| 28 | 0 0 1 0   1 0 0 0 |
| 21 | 15 \|\| 18 | 0 0 0 1   1 0 0 0 |
| 22 | 16 \|\| 14 | 0 0 0 1   0 1 0 0 |
| 23 | 17 \|\| 12 | 0 0 0 1   0 0 1 0 |
| 24 | 18 \|\| 30 | 0 0 1 1   0 0 0 0 |
| 25 | 19 \|\| 60 | 0 1 1 0   0 0 0 0 |
| 26 | 1A \|\| A0 | 1 0 1 0   0 0 0 0 |
| 27 | 1B \|\| C0 | 1 1 0 0   0 0 0 0 |
| 28 | 1C \|\| 90 | 1 0 0 1   0 0 0 0 |
| 29 | 1D \|\| 50 | 0 1 0 1   0 0 0 0 |
| 30 | 1E \|\| 11 | 0 0 0 1   0 0 0 1 |
| 31 | 1F \|\| 03 | 0 0 0 0   0 0 1 1 |
| 32 | 20 \|\| 05 | 0 0 0 0   0 1 0 1 |
| 33 | 21 \|\| 06 | 0 0 0 0   0 1 1 0 |
| 34 | 22 \|\| 0A | 0 0 0 0   1 0 1 0 |
| 35 | 23 \|\| 09 | 0 0 0 0   1 0 0 1 |
| 36 | 24 \|\| 0C | 0 0 0 0   1 1 0 0 |
| 37 | 25 \|\| 0E | 0 0 0 0   1 1 1 0 |
| 38 | 26 \|\| 0D | 0 0 0 0   1 1 0 1 |

| a | b | c | d | d' |
|---|---|---|---|---|
| 0 0 0 | 0 0 0 | 0 0 0 | 0 0 0 | 1 1 1 |
| 0 0 1 | 0 0 1 | 0 0 1 | 0 0 1 | 1 1 0 |
| 0 1 0 | 0 1 0 | 0 1 0 | 0 1 0 | 1 0 1 |
| 0 1 1 | 0 1 1 | 1 0 0 | 1 0 0 | 0 1 1 |
| 1 0 0 | 0 1 1 | 1 0 0 | 0 1 1 | 1 0 0 |
| 1 0 1 | 0 1 0 | 0 1 0 | 1 0 1 | 0 1 0 |
| 1 1 0 | 0 0 1 | 0 0 1 | 1 1 0 | 0 0 1 |
| 1 1 1 | 0 0 0 | 0 0 0 | 1 1 1 | 0 0 0 |

…

PULSE CODE MODULATION SYSTEM SUITABLE FOR DIGITAL RECORDING OF BROADBAND ANALOG SIGNALS

The present invention concerns a system of pulse code modulation suitable for recording video signals and likewise suitable for transmission of video or other broadband analog signals, after conversion to digital signals, over a channel having a high-pass characteristic, which is to say a channel that will not transmit a d.c. component.

In the magnetic recording of digitally encoded electrical signals, usually no low-frequency components or d.c. components of the digital signals can be effectively recorded or reproduced. Codes are therefore necessary that provide digital signals that have no d.c. component. Such codes can likewise be necessary for transmission of digital signals through a transmission channel which has a high-pass characteristic, which is to say it has a non-zero lower frequency limit.

A simple way of eliminating d.c. current is to add to signal segments of some given size, for example for every data word, a number of bits such that for the total signal segment thus completed, the number of low and high logic levels cancel out. This possibility is regarded as essentially trivial, because in practice the channel capacity is limited and can tolerate very little redundance and not enough redundance to permit the practice just outlined.

A method of transmitting digitally coded signals is known from U.S. Pat. No. 4,310,860 in which a given train of data is subdivided into sequences with and without a d.c. component, and the sequences with a d.c. component are replaced by sequences without a d.c. component. In this case it is also necessary to provide additional channel capacity for the substituted signals.

In another known method (Goldberg et al, "Optical Television Link and Playing a Digitally Modulated Laser", Journal of the SMPTE, Vol. 88, June 1979, pp. 414ff.) the digital signal is inverted from one sample to the next of the analog signal. This method provided satisfactory results only for certain contents of the signals to be tranmitted.

THE INVENTION

It is an object of the present invention to provide a pulse code modulation system in which digital signals are produced that, independently of the signal content to a very great extent, are substantially free from d.c. components, without any necessity of adding redundance to the signal.

Briefly, after inversion of alternate digital words, each representing a quantized sample of the analog signal level (i.e., value), the digital words are converted into a binary coded words in which the number of bits of one logic level depends approximately linearly on the magnitude of the level of the analog signal it represents. In other words for monotonically increasing steps of amplitude there is a monotonic increase, with pause required by the code but no reversals, in the number of the selected kind of binary bits. In such a code there will be successive subranges of analog level magnitude in which the number of bits of the said one logic level remains the same for all words. In those subranges, the change in the data words from one level to the next will be a change of two bits of the word. This system is highly satisfactory with the usual 8-bit words. It is useful to convert the 8-bit words to serial data before recording or transmission in the usual case. The decoding, as might be expected, is done in essentially the reverse manner, as further described in the detailed description further below.

The system of the present invention has been found to be sufficiently free of d.c. component for a very wide range of signal content and, of course, its advantages are obtained without adding any redundance to the signals.

The system of this invention is particularly advantageously usable for recording of video signals or transmitting them over channels, which like recordings, do not tolerate d.c. components. In the case of video signals, the various converters are all clocked by a pulse generator that is synchronized by the incoming synchronizing signals of the video signal. In reproduction, the synchronizing signals can be resupplied in synchronism with the picked-up signals. The system is also usable for recording audio signals, including multichannel audio signals.

THE DRAWINGS

The invention is further described by way of illustrative example with reference to the annexed drawings, in which:

FIG. 1 is a block circuit diagram of apparatus for coding and decoding in accordance with the system of the invention;

FIG. 2 is a table illustrating a code suitable for use in accordance with the invention;

Figure 3:
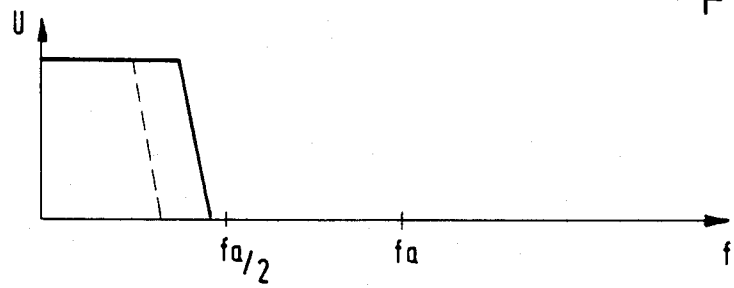
FIG. 3 is a signal spectrum of a band limited analog signal to be transmitted.

FIG. 1 is a diagram of an embodiment of the invention. A video signal which is to be recorded is supplied at 1. This signal proceeds on the one hand through a low-pass filter to an analog-to-digital converter 4 and, on the other hand, to a clock pulse and synchronizing signal generator. In the latter, the synchronizing signal is separated from the video signal. The sample timing for the analog-to-digital converter 4 is obtained from the separated synchronizing signal, as are also clock signals later to be described. The digital output signal of an analog-to-digital converter usually consists of a multi-bit binary word, which for example will begin at the lowest video level with 0000 and at the highest video level will have the value 1111. For obtaining a sufficiently high resolution of the amplitude levels of the video signal, an 8-bit digital word is usually transmitted. In order to invert every other sample word, a signal with half the sampling frequency is provided from the clock and synchronizing generator 3 to a switch 7. The switch 7 conducts during a sample period the digital signal provided through the inverter 5 and the digital signal provided through a buffer, to a code converter 8. In this code converter 8, out of the binary output words of the analog-to-digital converter 4, a digital signal is produced having a code by which, within a coded word, the number of bits having one of the logical levels has an approximately linear dependence upon the momentary value of the analog signal. Also, from one level step to the next of the analog signal, only one or two bits of a words will change.

Figure 2A:
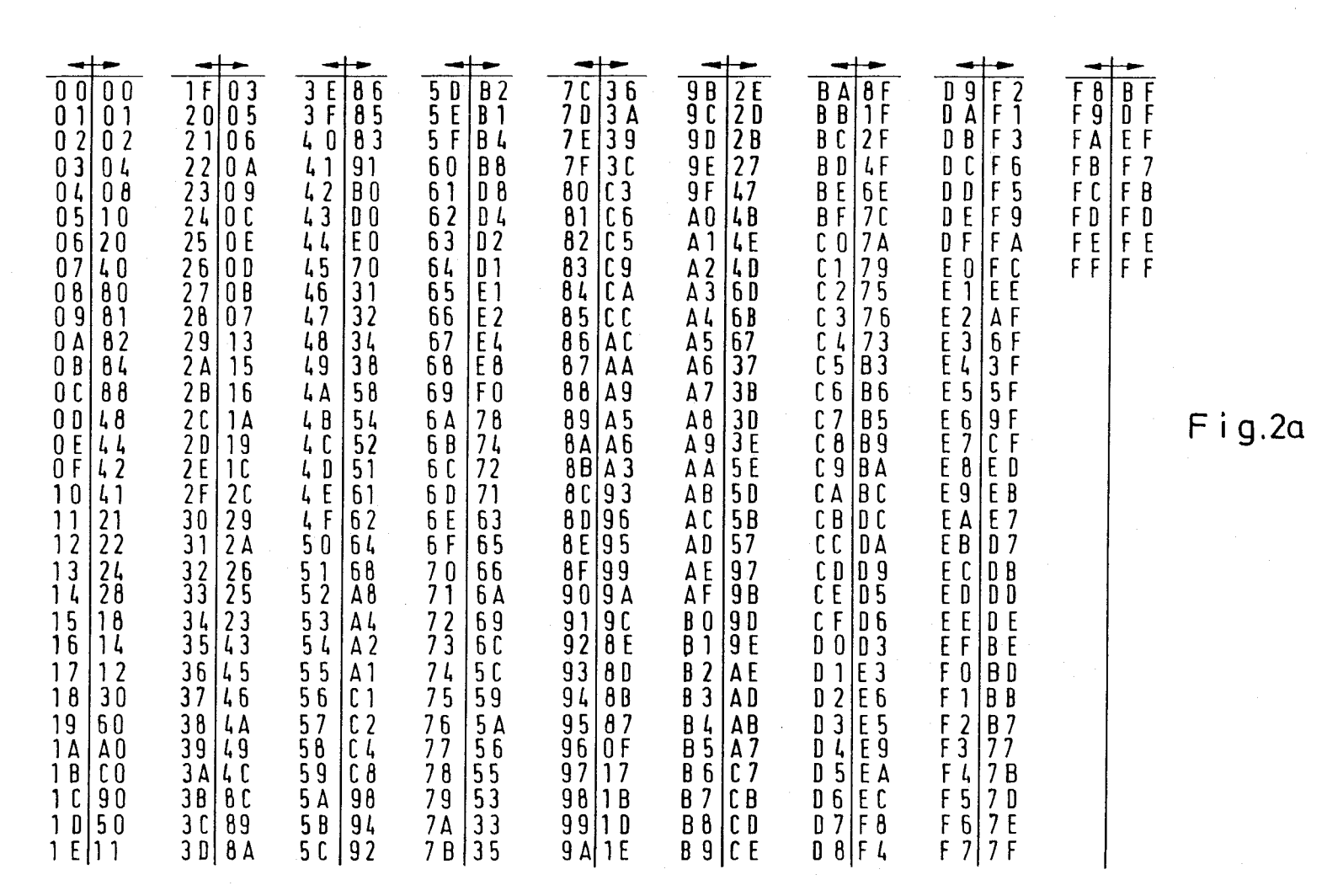

In an actual embodiment of the circuit shown in FIG. 1, the switch 7 will of course be constituted with the usual combination logic circuits of digital technology. The code converter can consist of a programmable read-only memory (PROM). An example of an 8-bit code with linearly increasing mean value is illustrated in FIG. 2a by a code table comparing the code according to the invention with one written in a hexadecimal code. FIG. 2b shows a section of the table of FIG. 2a from which it is evident that within a range of signal level with constant count of "1" bits per word for all levels in this range, merely 2 bits change from one level to the next.

In the circuit 9 of FIG. 1, there is added to the digital signals a digital synchronizing signal which is derived from the synchronizing signal of the video signal by the clock and synchronizing generator 3. The parallel-series converter 10 then finally converts the digital signal bit-parallel words into a serial digital signal, which is supplied to the schematically shown recording device or to a transmission channel with a high-pass characteristic 12.

FIGS. 3 to 6 show the spectra of the signals occurring in a circuit according to FIG. 1. FIG. 3 shows the spectrum of the video signal supplied at 1 which is limited to a value below the half sampling frequency $f_s/2$. There is shown in broken lines, as an alternative, a video spectrum with a lower upper limiting frequency.

Figure 4:
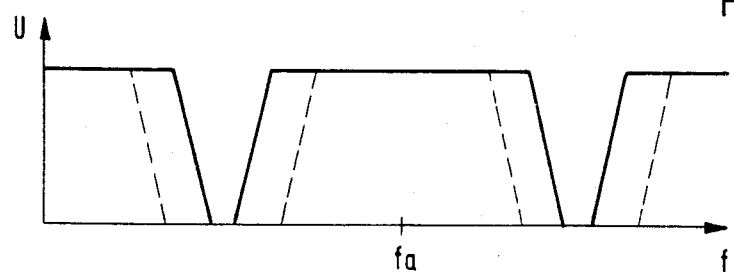
FIG. 4 is a signal spectrum of an equivalent pulse amplitude modulation equivalent produced by digital-to-analog reconversion, using a binary code.
Figure 5:
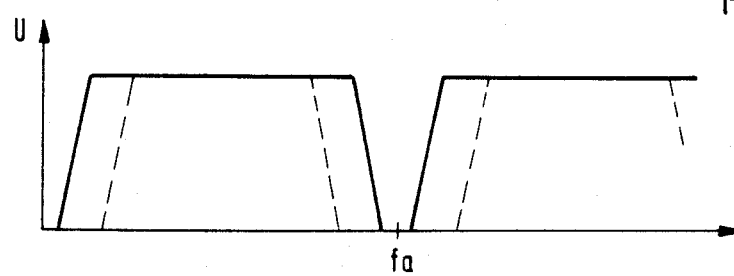
FIG. 5 is a spectrum of an equivalent pulse amplitude modulation obtained by digital-to-analog reconversion after inverting the digital signal from sample value to sample value.

FIG. 4 shows the spectrum of the sampled analog video signal, and FIG. 5 shows the spectrum of the signal which would be produced by digital-to-analog reconversion of the digital signal present at the output of the switch 7 (FIG. 1). From FIG. 5, it is evident that this signal has no d.c. component and that the lower boundary frequency corresponding to the spacing of the upper boundary frequency of the analog video signal to the half sampling frequency is different from 0.

Since by coding according to the invention, the mean signal value per digital data coded word is an approximately linear function of the corresponding mean analog level over a corresponding period of time, the serial digital signal itself after transcoding has a spectrum similar to the signal represented in FIG. 5 in the low-frequency region.

Figure 6:
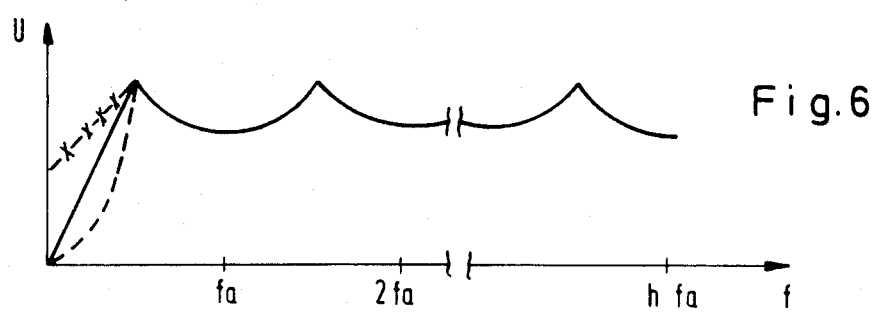
FIG. 6 is a spectrum obtained with the system of serial data signals in accordance with the invention.

FIG. 6 shows the spectrum of the serial data signal at the circuit point 11 (solid line). The signal has no d.c. component.

By the broken line there is shown the deviation of the spectrum for a band-limiting of the video signal by a lower frequency.

For comparison, there is also shown in FIG. 6, by the cross-dash line at the left, the spectrum that results if the digital signal is inverted from sample to sample, but no transcoding is produced in the code converter 8.

The played back or transmitted serial digital signal is supplied at 13 (FIG. 1) to a serial-parallel converter 14 and to a clock and synchronism regenerator 15. The output signal is supplied to a code converter 16 having a function opposite to that of the code converter 8, so that at its output a binary coded signal, like the one described at the beginning of this description, is present. This signal is again inverted from sample to sample by means of the circuit 17,18 and 19, so as to cancel out the corresponding inverting produced by the circuits 5,6 and 7. The switch 19 is for this purpose supplied a signal produced by the clock and synchronism regenerator 15 having the half sampling frequency $f_s/2$. By means of the digital-to-analog converter 20, the analog video signal is finally produced, which now becomes available at the output 21 for further use.

The individual circuits shown in FIG. 1 as blocks correspond basically to known circuits and, being, therefore, well-known in the art, do not need to be further described here.

For some of them suitable integrated circuits are available, e.g. the blocks 5,6, and 7 and the blocks 17, 18, and 19 can be realized by two ICs type SN7486 which comprises several gate circuits. As mentioned above, the blocks 8 and 16 are PROMs, an example therefor is the type SN74471.

Suitable A/D- and D/A-converters (2,20) are available from the manufacturer TRAW having type numbers TDC1007 and TDC1008. The clock and synchronizing generator 3 comprises a master oscillator producing a frequency which is a multiple of the sampling frequency. For an 8 bit system e.g. the master frequency is 8 times as high as the sampling frequency. By well-known frequency dividers the sampling frequency and half the sampling frequency are generated.

The master oscillator may be locked with the television sync signal. The sync signal supplied to the circuit 9 of FIG. 1 usually precedes several digital data words providing synchronization of the regenerator 15 of FIG. 1. Such synchronizing signal usually comprises one or more data words of e.g. 8 bits each which does or do not occur frequently in the data stream itself.

Such synchronizing signal is added to the digital signal into time intervals when no digital information occurs. In case of video signals this may be the horizontal blanking interval. If there are more synchronizing signals during one TV line necessary this can be done whereby the data blocks following each synchronizing signals are to be delayed by the duration of the synchronizing signal by means of other stores.

Essential parts of the clock and synchronizing regenerator 15 are a bit synchronizing circuit and a word synchronizing circuit. The bit synchronizing circuit may be a circuit as shown in U.S. Pat. No. 4,413,236 or in U.S. Pat. No. 3,646,269. The word synchronizing circuit comprises a comparator which compares the incoming data with the stored synchronizing word and which generates a synchronizing signal in case of correlation between both words.

Although the invention has been described with reference to a particular illustrative example, it will be understood that variations and modifications are possible within the inventive concept. E.g. the sequence of the code converter 8 and the switchable inverting circuits 5,6, and 7 may be changed so that first the code according to FIG. 2 will be generated and thereafter each second sample will be inverted. Accordingly this applies to the circuits 16, 17, 18 and 19.

Figures 7, 8:
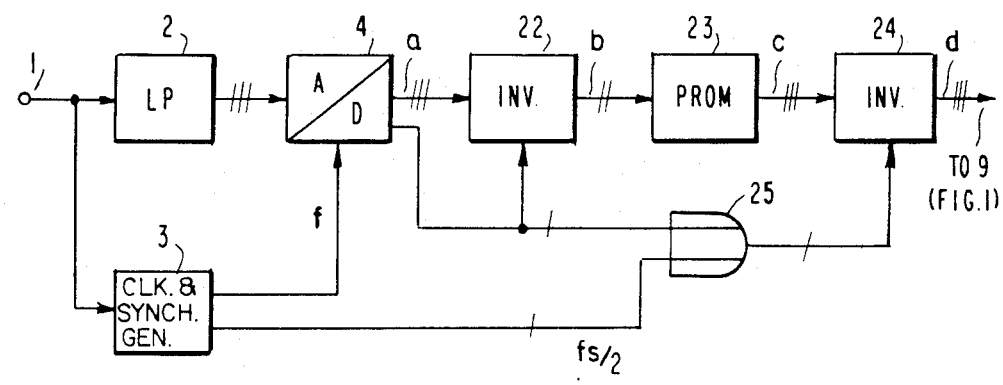
FIG. 7 is a block circuit diagram of a further embodiment of the invention.
FIG. 8 is a table illustrating a code used in the embodiment of FIG. 8.

Another embodiment for coding in accordance with the system of the invention is shown in FIG. 7. Digital signals occurring at various points of the arrangement according to FIG. 7 are shown in FIG. 8.

The input 1 and the circuits 2, 3, and 4 are principally the same ones as those in FIG. 1. The inverting stages 22 and 24 are similar to the items 5, 6, and 7 in FIG. 1;

the function thereof is to invert the incoming signal depending on a control signal applied to such inverting stage. The PROM 23 has the function of a code converter. The arrangement shown in FIG. 7 may substitute parts of the arrangement of FIG. 1 before the circuit 9.

The essential difference between both arrangements is that the digital words of the code used in the arrangement of FIG. 7 being symmetrical to the 50% level of the amplitude range are inverse to each other. As shown in connection with FIG. 8 this code has the advantage that less capacity is required in the PROM 23.

FIG. 8 shows digital signals comprising less bits than in practice to be more illustrative. Column a shows the digital signals at the output of the A/D converter 4 for 8 possible amplitude steps of the input signals. These digital signals are based on a so-called binary code. According to the invention the number of ones shown in column d increases from 0 to 3. Because there are only shown a few amplitude steps the difference between a and d is not very large; but the principle of increasing the number of ones is shown in FIG. 2.

The A/D converter 4 of the arrangement of FIG. 7 has a separate output for the most significant bit (MSB) of the signal shown in a column a. This MSB is supplied to the control input of the inverting circuit 22 acting in such a way that if the MSB is 0, the output signals of the A/D converter 4 are not inverted but if the MSB is 1, then the signals are inverted. The result of this operation is shown in column b. As it is easy to be seen the digital signals of column b are symmetrical to the 50% level of the entire amplitude range. Therefore, the code converter 23 needs less storage capacity than the code converter in the arrangement of FIG. 1. The function table of the PROM 23 is illustrated by a frame in FIG. 8. Column c shows the digital output signals of PROM 23 and column d shows the output signals of the inverter circuit 24. The inverter circuit 24 is controlled by a signal which is derived out of a clock signal having a frequency of fs/2 and the MSB of the output signal of the A/D converter 4 by means of an exclusive OR gate 25. So controlled the inverting circuit 24 compensates the inversion introduced by the inverting circuit 22 and cares for the sample-by-sample inversion.

The result is shown in column d of FIG. 8 for one sample and in column d' for a subsequent sample of the input signal.

I claim:

1. Pulse code modulation method for use in recording digital signals or transmitting them through a channel having a high-pass characteristic, comprising the steps of:
    converting an analog signal to be recorded or transmitted into a sequence of digital words, which respectively represent quantized samples of the analog signal level in a binary code at a sampling rate not lower than twice the highest frequency in said analog signal;
    inverting alternate digital words, each corresponding to a quantized sample provided as the result of analog-to-digital conversion, and
    converting said digital words into coded words, such that within each said coded word the number of bits having a selected one of the two states, 1 or 0, has an approximately linear dependence upon the value of the corresponding analog signal level.

2. A method as defined in claim 1, in which within a level range of the analog signal for which said coded words have the same number of bits of said one state, the coded words change from one quantized level to an adjacent quantized level of the analog signal, in each case, by a change of two bits of the coded word.

3. A method as defined in claim 1 or claim 2, in which the analog signal has its frequency band limited before being supplied to the analog-to-digital converter.

4. A method as defined in claim 3, in which the coded words are 8-bit words and in which the change from one quantized analog signal level to an adjacent quantized analog signal level involves the change of not less than one bit and not more than two bits of the coded word.

5. Apparatus for encoding analog signals digitally for recording or for a transmission channel having a high-pass characteristic, comprising:
    means for converting said analog signal to a digital words, respectively representing quantized levels of samples of said analog signals at a sampling rate which is not less than twice the highest frequency of said analog signal;
    means for inverting alternate digital words of the output of said converting means, and
    code conversion means for putting the digital words representing each analog sample into coded words into which the number of bits having a selected one of the two states, 1 or 0, has an approximately linear dependence upon the corresponding analog signal level.

6. Apparatus as defined in claim 5, in which said code conversion means is constituted to convert said digital words into coded words in which there are level ranges of the analog signal for which the number of bits of said one of said two states, 1 or 0, remains constant and in which code, within said level ranges with a constant number of bits of said one of said two states, the change of coded words from one quantized level of said analog signal to an adjacent quantized level of said analog signal is a change of two bits of the coded word.

7. Apparatus as defined in claim 6, in which said coded words are 8-bit words and the change of said 8-bit words, in going from one quantized analog signal level to an adjacent quantized analog signal level, is a change of either one or two bits in every case.

8. Apparatus as defined in claim 5,6 or 7, in which a low-pass filter for limiting the frequency range of said analog signal is provided ahead of said analog-to-digital converter.

9. Apparatus as defined in claim 5,6 or 7, in which said analog signal is a video signal comprising synchronizing signals, and in which a synchronizing signal generator is provided, as well as means for synchronizing said generator to the synchronizing signals of said video signal, and in which said synchronizing signal generator has a clock frequency output to control the sampling rate of the digital-to-analog converter.

10. Apparatus as defined in claim 5,6 or 7, in which parallel-to-serial digital signal conversion means are provided for converting the output of said code conversion means to a serial digital signal.

11. A method of decoding a digital signal representing an analog signal and encoded in a code in which each coded word representing a quantized sample of the analog signal has a number of bits of a selected one of the two states of the binary code which number depends approximately linearly upon the level of the corresponding quantized analog signal sample, comprising the steps of:

converting the coded words of said digital signals so as to put each coded word thereof into digital words readily converted into analog signals;

inverting alternate digital words resulting from the foregoing conversion step, and converting the resulting digital words into quantized analog signal samples and combining said samples to provide an analog signal.

12. A method as defined in claim 11, in which the coded words are in serial form and are subjected to a serial-to-parallel conversion before the coded word conversion step.

13. Apparatus for decoding digital signals composed of digital words, each representing a quantized sample of an analog signal and each encoded in coded words in which the number of bits of a selected one of the two states, 1 or 0, of the binary code in each word has an approximately linear dependence upon the level of the corresponding quantized analog signal sample, comprising:

code conversion means for putting the coded words into a digital words more readily convertible into an analog signal;

means for inverting alternate digital words of the output of said code conversion means;

means for converting the digital words provided by the output of said code conversion and inverting means into analog signal samples, and means for combining said analog signal samples to provide an analog signal.

14. Apparatus as defined in claim 13, in which said code conversion means is constituted to operate on an input coding in which there are magnitude ranges of the analog signal samples represented by said coded words for which the number of bits per word of said one of said two states remains constant and in which code, within said magnitude ranges for a constant number of bits of said one of said two states in a word, the difference between words representing adjacent quantized magnitude levels of analog signal samle magnitude is a change of two bits of the word.

15. Apparatus as defined in claim 14, in which the coded words of said digital signals are 8-bit words and the difference between 8-bit words, before code conversion, representing adjacent analog signal sample quantized magnitude levels is a chage of either one or two bits in every case.

16. Apparatus as defined in claim 14 or 15, in which the coded words are in a serial stream initially, and in which means for serial-to-parallel conversion of said coded words for providing parallel bit transmission of data words thereof to said code conversion means are connected ahead of said code conversion means.

17. Pulse code modulation method for use in recording digital signals or transmitting them through a channel having a high-pass characteristic, comprising the steps of:

converting the analog signal to be recorded or transmitted into digital words at a sampling rate not lower than twice the highest frequency in said analog signal;

converting the digital words into coded words, such that within each said coded word the number of bits having a selected one of the two states of the binary code has an approximately linear dependence upon the level of the corresponding analog signal, and inverting alternate coded words produced by the step of converting digital words into coded words.

18. Pulse code modulation method for use in recording digital signals or transmitting them through a channel having a high-pass characteristic, comprising the steps of:

converting the analog signal to be recorded or transmitted into digital words at a sampling rate not lower than twice the highest frequency in said analog signal, converting the digital words into coded words, such that amplitude values being symmetrical to the 50% level of the entire amlitude range are represented by coded words which are inverse to each other, and that within each said coded word the number of bits having a selected one of the two states, 1 or 0, of the binary code has an approximately linear dependence upon the level of the corresponding analog signal, and then inverting alternate coded words produced by the step of converting digital words into coded words.

* * * * *